United States Patent [19]

Bruner et al.

[11] 4,186,913
[45] Feb. 5, 1980

[54] BARRIER

[76] Inventors: A. J. Bruner, 2166 Katherine St., Ft. Myers, Fla. 33901; Edward T. Foster, 1050 Hollywood Blvd., Hollywood, Fla. 33019; Thomas N. Kearns, 3500 Pembroke Rd., Hollywood, Fla. 33021

[21] Appl. No.: 642,199

[22] Filed: Dec. 18, 1975

[51] Int. Cl.² ........................ E01F 15/00; E01F 13/00; E02B 3/06
[52] U.S. Cl. .................................. 256/13.1; 116/63 P; 256/1; 404/6; 405/21
[58] Field of Search .................... 61/2, 3, 4, 5; 404/9, 404/10, 6; 256/13.1; 114/219; 405/21, 23

[56] References Cited

U.S. PATENT DOCUMENTS

| 1,922,462 | 8/1933 | Tranchell | 404/13 |
| 2,851,935 | 9/1958 | Weeks | 404/13 |
| 3,380,428 | 4/1968 | Abrams | 404/10 X |
| 3,485,201 | 12/1969 | Kelley | 404/10 X |
| 3,661,359 | 5/1972 | Walker | 256/13.1 X |
| 3,928,701 | 12/1975 | Roehner | 61/4 X |
| 3,934,540 | 1/1976 | Bruner et al. | 404/10 X |

Primary Examiner—Alexander Grosz
Attorney, Agent, or Firm—William A. Drucker

[57] ABSTRACT

A barrier for use as a breakwater or highway safety divider having a reinforced resilient base in which are embedded a plurality of tires extending outwardly of said base and means for joining a plurality of said bases in line.

2 Claims, 10 Drawing Figures

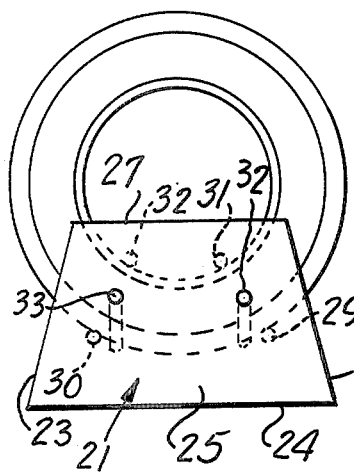
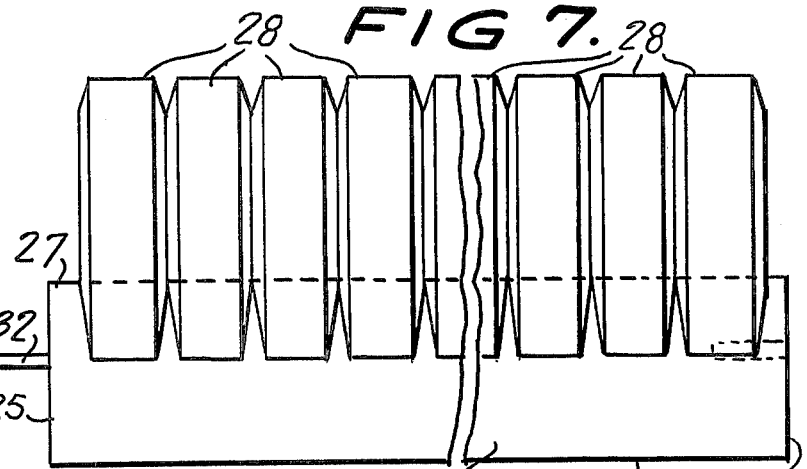
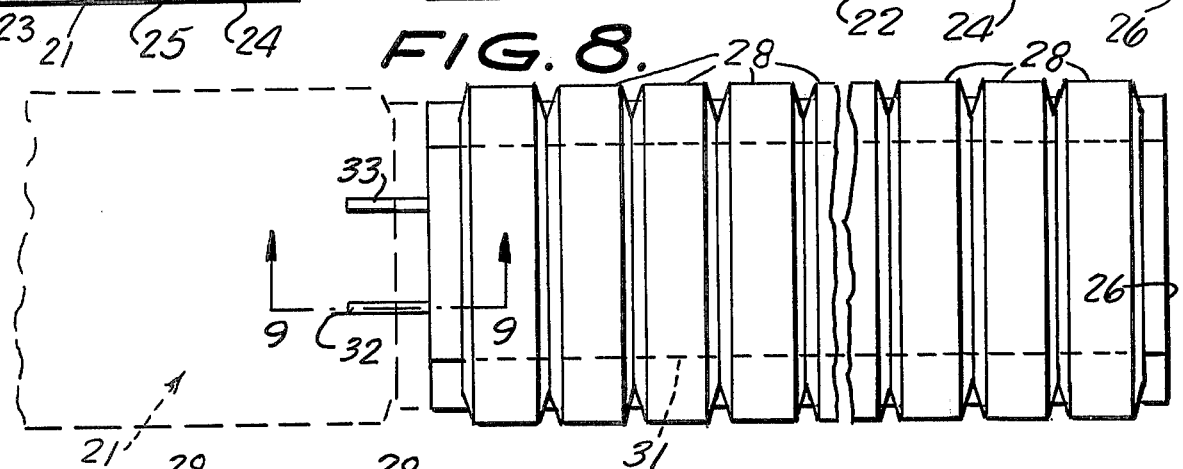
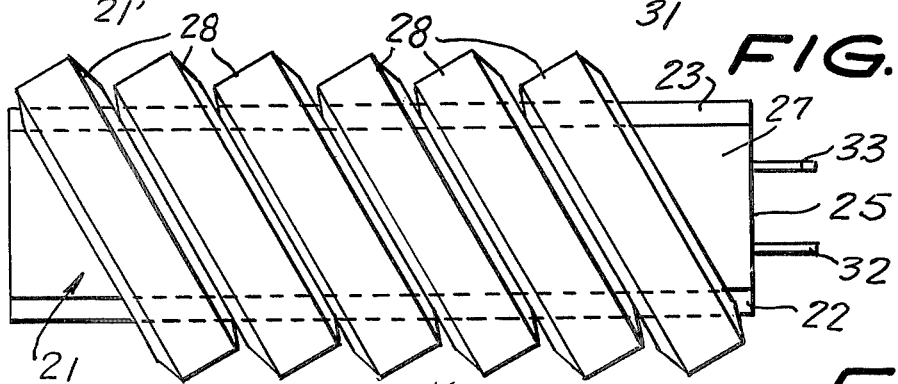
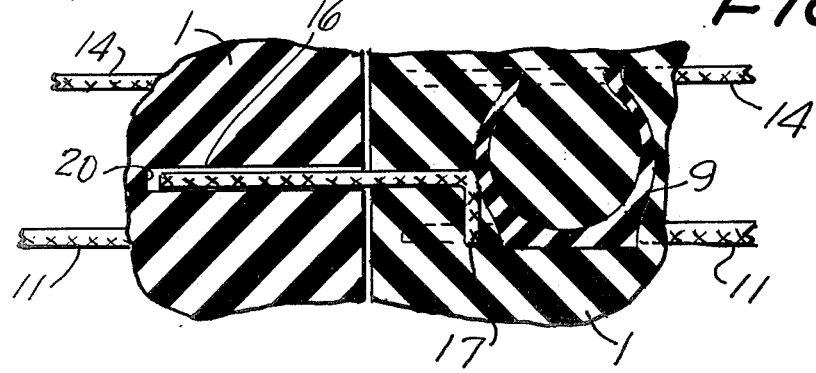

BARRIER

The present invention is concerned with an improvement in barriers.

The principal object of the invention is to provide a barrier which can be of any desired length and can be readily mounted on a beach as a breakwater or can equally as well be positioned along a roadway as a traffic divider or safety zone on curves of both single and dual lane highways.

Another important object of the invention is to provide a barrier with a heavy base in which are embedded portions of tires, preferably used vehicle tires, which extend from the base at an angle to provide for the passage of waves between the tires when the barrier is used as a groin or as a resilient bumper when used as a road divider or safety rail.

A still further object of the invention is to provide a barrier consisting of sections which can be joined longitudinally of one another without the use of tools or special knowledge, to form any desired length of barrier.

Figure 1:
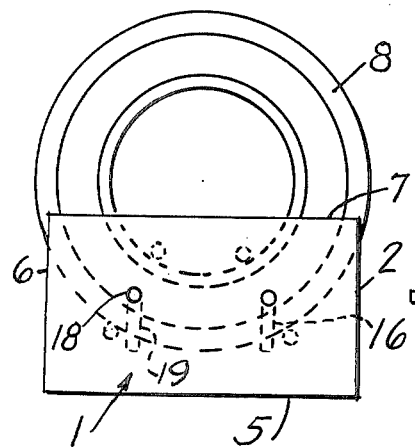
Figure 2:
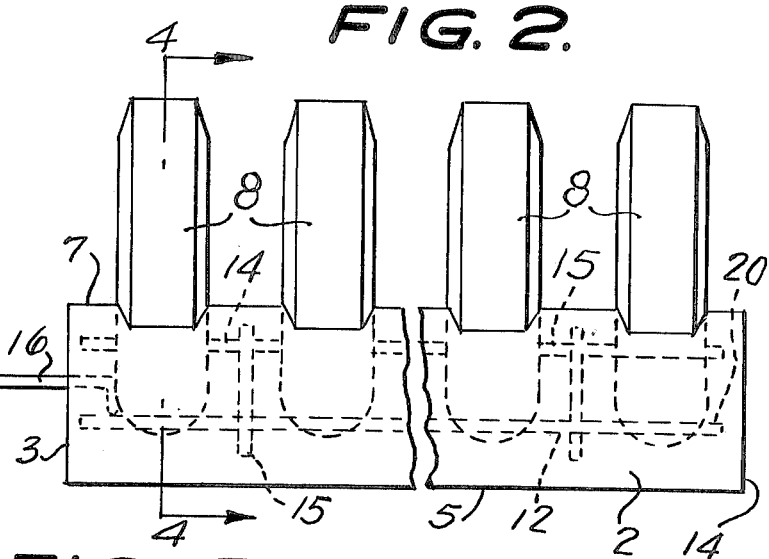
Figure 3:
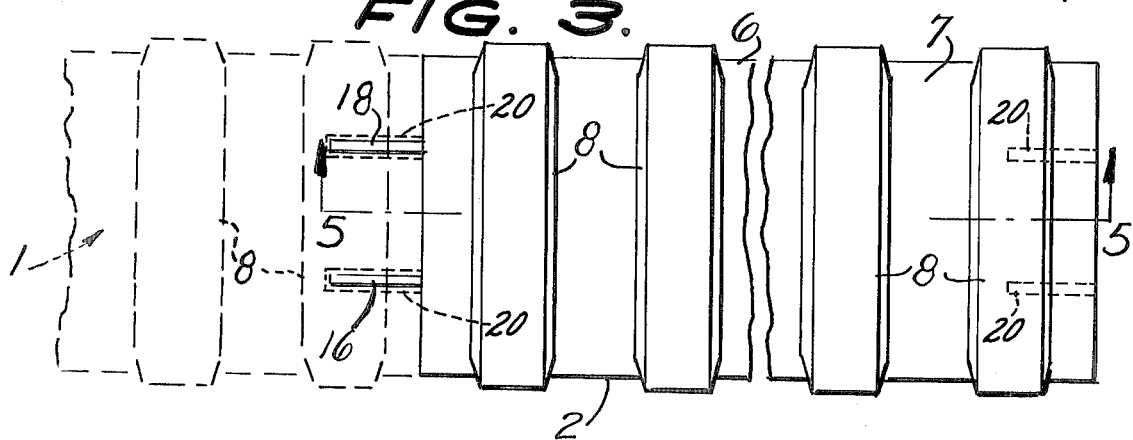
Figure 4:
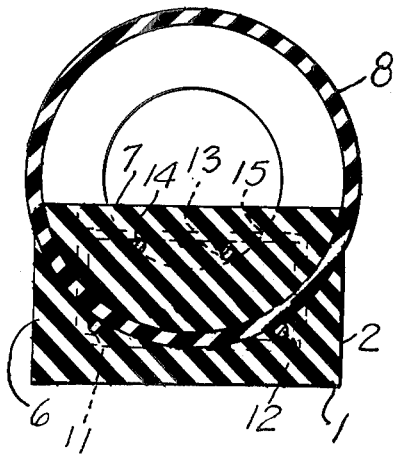
Figure 5:
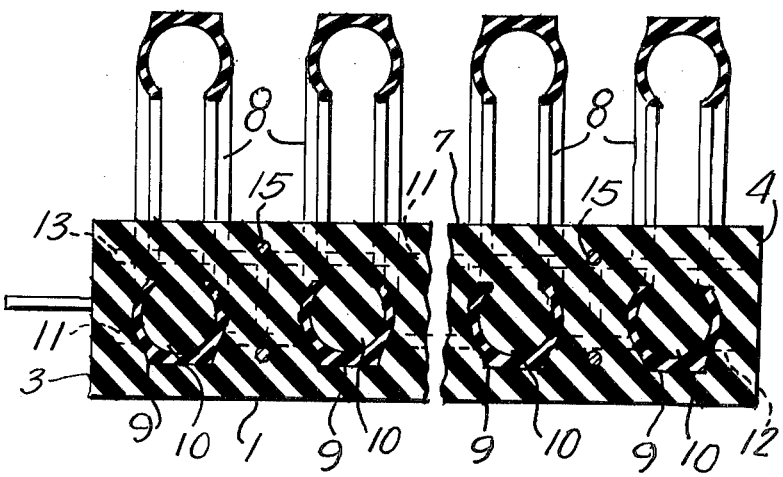

Further objects of the invention will be pointed out in or obvious from the following description of the accompanying drawings, in which, FIG. 1 is an end view of a section of the present barrier, FIG. 2 is a side elevation of said section, FIG. 3 is a top view of said section with a portion of a second section shown in dotted line, attached thereto, FIG. 4 is a cross-sectional view taken on line 4—4 of FIG. 2, FIG. 5 is a longitudinal section, partly broken away, taken on line 5—5 of FIG. 3, FIG. 6 is an end view of a modified form of the barrier section, FIG. 7 is a side elevation of the section of FIG. 6, FIG. 8 is a top view of the modified section, FIG. 9 is an enlarged detail sectional view of the connection of two of said sections, and, FIG. 10 is a modified view of the section of FIGS. 6 to 8.

Referring now more particularly to the accompanying drawings wherein like and corresponding parts are designated by the same reference numerals, 1 generally indicates a resilient block, preferably of rubber, having sides 2 and 6, ends 3 and 4, bottom 5 and top 7 with said sides and ends extending substantially normal to said bottom and top.

A plurality of tires, preferably used pneumatic vehicle tires, are partially embedded in said resilient block 1 with their lower portions 9 completely encased in said block which also fills the interior portions 10 of said tires in said block fixedly supporting said tires extending upright and acress said block.

A pair of tie rods 11 and 12 extend longitudinally in said block just below the fire treads, while a second pair of tie rods 13 and 14 extend longitudinally of said block through the center opening of said tires adjacent the beads thereof. A plurality of plates 15 are also embedded laterally of and in said block with said tie rods 11-14 extending therethrough.

In end 3 of said block there is partially embedded a pair of L-shaped dowel pins 16 and 18 whose bases 17 and 19 respectively extend laterally of said block while their legs extend longitudinally from said block. End 4 of each block has recesses 20 each positioned and sized for receiving a dowel pin 16 or 18 therein as shown in FIGS. 3 and 9 for joining two of said blocks together in line and as many of said blocks 1 can be similarly joined together to form a barrier as long as desired.

Each barrier section of FIGS. 6–8 is similar to that previously described in that it has resilient block 21, preferably of rubber, with sides 22 and 23, bottom 24, ends 25 and 26 and top 27. However sides 22 and 23 incline inwardly from bottom 24 to top 27 so that a greater portion of abutting tires 28 extend outside of said block and particularly beyond sides 22 and 23.

Tie rods 29–32, dowel pins 32 and end recess 33 are the same as for the same elements of section of FIGS. 1–5.

In FIGS. 2, 3 and 5 the tires 8 are shown spaced apart so that when the barrier is used as a breakwater waves can move between the tires without being impeded. In FIGS. 7 and 8 the tires 28 are abutting one another to provide a resilient bumper at each side so that when the barrier is used as a safety divider alongside a road a vehicle striking the same would be diverted with minimum damage back on to the roadway. As indicated in FIG. 10 tires 28 can also be positioned on an acute angle to block 21.

To produce the above described barriers block 1 or 21 can be molded in forms, not shown, by positioning tires 8 or 28 in the open top of the form, tie rods 11–14 or 29–33 suspended in said form plates 15 likewise suspended in said form with the tie rods therethrough and dowel pins 16 and 18 or 32–33 suspended in said form whereupon molten rubber can be poured into the form to complete the barrier section. End openings 20 or 33 can be formed during said molding by collapsible pins being suspended in the form.

In the preferred form of the barrier section, for example, tires 8 or 28 can be used automobile or earth mover tires so as to provide a use for these tires which are in many instances discarded. Blocks 1 or 21 could be 2 feet thick by 3½ feet wide by 2 feet high, tie rods 11–14 and 29–33 can be ¾ inch or heavier rod material while plates 15 can be ½ inch thick and placed two to 3 feet apart as needed. Dowel pins 16 and 18 can be 1½ inch in diameter and extend 18 inches from each block. The length of blocks 1 or 21 can be of any desired length such as thirty feet in length.

For example, blocks 1 could be placed end to end with dowel pins 16 and 18 of each block in openings 20 of the next block with the entire barrier set on a beach extending into the water to form a breakwater.

Blocks 21 can likewise be placed end to end with dowel pins 32–33 of each block in openings 33 of the next block and the resulting barrier positioned alongside a road particularly at a curve thereof or between dual lanes or a single block 21 so positioned to prevent vehicles from running off the rod at those locations.

Blocks 1 and 21 could preferably be made by chopping up used vehicle tires, melting the tires and molding the blocks with tires 8 and 28 therein. However other elastomeric material can also be used.

We claim:
1. A barrier section comprising:
(i) a moulded rubber base block of elongated configuration having a top and bottom and sides, and ends normal to said top and bottom,
(ii) a plurality of vehicle tires having beads and a center opening, said tires or fragments thereof being axially aligned and spaced apart and being partially embedded side by side in the top of said block to a depth at least below the beads and being positioned along the length and top of said block and extending in greater part above said block, (iii) tie rod means extending in said block through the tire center openings, and through the lower part of said block, at opposite sides thereof.

2. A barrier section, as claimed in claim 1, comprising dowel means extending longitudinally from one end of said block, the block having recessing opening at its other end to receive the dowel means of another such block for coupling the blocks end to end.

* * * * *